United States Patent
Gerphagnon et al.

(10) Patent No.: US 11,755,541 B2
(45) Date of Patent: Sep. 12, 2023

(54) DISTRIBUTED FILE SYSTEM AND METHOD FOR ACCESSING A FILE IN SUCH A SYSTEM

(71) Applicant: BULL SAS, Les Clayes-sous-Bois (FR)

(72) Inventors: Jean-Olivier Gerphagnon, Vif (FR); Jean-Pascal Mazzilli, Champagnier (FR); Matthieu Perotin, Gières (FR)

(73) Assignee: BULL SAS, Les Clayes-sous-Bois (FR)

( * ) Notice: Subject to any disclaimer, the term of this patent is extended or adjusted under 35 U.S.C. 154(b) by 190 days.

(21) Appl. No.: 17/344,874

(22) Filed: Jun. 10, 2021

(65) Prior Publication Data
US 2021/0390082 A1 Dec. 16, 2021

(30) Foreign Application Priority Data

Jun. 10, 2020 (EP) .................................. 20305626

(51) Int. Cl.
*G06F 16/00* (2019.01)
*G06F 16/176* (2019.01)
(Continued)

(52) U.S. Cl.
CPC .......... *G06F 16/1767* (2019.01); *G06F 16/11* (2019.01); *G06F 16/116* (2019.01);
(Continued)

(58) Field of Classification Search
CPC ............. G06F 16/10–11; G06F 16/116; G06F 16/119; G06F 16/128; G06F 16/13;
(Continued)

(56) References Cited

U.S. PATENT DOCUMENTS

| | | | |
|---|---|---|---|
| 9,378,067 B1* | 6/2016 | Agarwala | G06F 15/17331 |
| 2002/0073057 A1* | 6/2002 | Benoit | G06F 8/61 |
| 2003/0028761 A1* | 2/2003 | Platt | G06F 11/1417 |
| | | | 726/33 |

(Continued)

FOREIGN PATENT DOCUMENTS

| | | |
|---|---|---|
| WO | WO2006021890 A2 * | 3/2006 |
| WO | WO2007121241 A2 * | 10/2007 |

(Continued)

OTHER PUBLICATIONS

Sau-Ming Lau et al., Adaptive load distribution algorithms for heterogeneous distributed systems with multiple task classes, J. Parallel Distrib. Comput. 66 (2006) , 2006 pp. 163-180.*

(Continued)

*Primary Examiner* — Srirama Channavajjala
(74) *Attorney, Agent, or Firm* — ARC IP LAW, PC; Joseph J. Mayo

(57) ABSTRACT

An aspect of the invention relates to a method for a plurality of clients to access a file in a distributed file system, the file being replicated on at least one other server, the method comprising the steps of:
  Receiving, by an access management device, a request to access the part of the file sent by a first client from the plurality of clients,
  Selecting a first server based on at least one parameter,
  Authorization the first client to access the file stored by the first server
  Receiving, following authorization, a request to access the same file sent by a second client, the second client being different from the first client,
  Selecting a second server based on the parameter, the second server being different from the first server,
  Authorizing the second client to access the file stored by the second server.

12 Claims, 3 Drawing Sheets

(51) Int. Cl.
    *G06F 16/13*     (2019.01)
    *G06F 16/182*     (2019.01)
    *G06F 16/17*     (2019.01)
    *G06F 16/11*     (2019.01)
    *G06F 16/185*     (2019.01)
    *G06F 16/18*     (2019.01)

(52) U.S. Cl.
    CPC ............ *G06F 16/122* (2019.01); *G06F 16/13* (2019.01); *G06F 16/1734* (2019.01); *G06F 16/182* (2019.01); *G06F 16/185* (2019.01); *G06F 16/1873* (2019.01)

(58) Field of Classification Search
    CPC .... G06F 16/137; G06F 16/152; G06F 16/164; G06F 16/17; G06F 16/2255; G06F 16/184; G06F 16/1844; G06F 16/1815; G06F 16/1767; G06F 16/182; G06F 16/1734; G06F 16/122; G06F 16/185; G06F 16/1873
    See application file for complete search history.

(56) References Cited

U.S. PATENT DOCUMENTS

| | | | | |
|---|---|---|---|---|
| 2005/0267982 | A1* | 12/2005 | Nakatani | ............ H04L 67/1097 709/233 |
| 2009/0285219 | A1* | 11/2009 | Romrell | ................. H04L 45/48 370/395.41 |
| 2011/0153570 | A1* | 6/2011 | Kim | ..................... G06F 11/2048 707/674 |
| 2013/0311616 | A1* | 11/2013 | Wang | .................... H04L 67/148 709/219 |
| 2014/0195488 | A1* | 7/2014 | Patil | .................... G06F 16/1752 707/634 |
| 2017/0026263 | A1* | 1/2017 | Gell | ...................... H04L 67/1023 |
| 2019/0050583 | A1* | 2/2019 | Lu | ......................... G06F 21/604 |
| 2020/0226104 | A1* | 7/2020 | Madappa | ................ G06F 3/067 |
| 2020/0242082 | A1* | 7/2020 | Chmiel | ............... H04L 67/1097 |

FOREIGN PATENT DOCUMENTS

| | | | |
|---|---|---|---|
| WO | WO2011160054 | A1 * | 12/2011 |
| WO | WO2012068184 | A1 * | 5/2012 |
| WO | 2012167094 | | 12/2012 |

OTHER PUBLICATIONS

European Search Report issued in EP20305626, dated Nov. 9, 2020 (10 pages).

Yang, et al., "Intelligent Offload Detection for Achieving Approximately Optimal Load Balancing", IEEE Access, vol. 6, Oct. 31, 2018; pp. 58609-58618.

* cited by examiner

DISTRIBUTED FILE SYSTEM AND METHOD FOR ACCESSING A FILE IN SUCH A SYSTEM

BACKGROUND OF THE INVENTION

Technical Field of the Invention

The technical field of the invention is that of distributed file systems.

At least one embodiment of the invention relates to the improvement in the performance of distributed file systems for several clients to access the same part of a file or the same file, and in particular within the context of high-performance computing systems (HPC).

Description of the Related Art

High-performance computing systems comprise a plurality of computing nodes, storage nodes comprising data-storage drives and a high-speed communication infrastructure. For instance, the stored data may consist of network boot images, used when booting computing nodes. Computing nodes implement applications, for example dedicated to computing, and storage nodes implement a file system to enable applications to access the data stored by the storage node drives.

Known distributed file systems, such as Ceph® or GlusterFS®, make network file sharing possible between a plurality of clients. Thus, certain nodes from the plurality of computing nodes may have access to the same data, for example the same network boot image, in the form of files or objects.

The files of most distributed file systems are stored in the form of fixed-size data blocks. This is shown in [FIG. 1]. In the distributed file system 1 in [FIG. 1], a file 10 is divided into three data blocks A, B and C. For instance, in the event that the file 10 is 12 megabytes, it is divided into three blocks A, B and C, with a size of 4 megabytes each. Blocks A, B and C of the file 10 may each be stored in a different storage node, also called a file server in a distributed file system. In the example shown in [FIG. 1], the file server S1 comprises block A, the file server S2 comprises block B and the file server S3 stores block C. This distribution makes it possible to spread access to the file 10 over several servers S1 to S3, without congesting a single server for a long time. Thus, a client C1 who wishes to access the file 10 comprising the three blocks A, B and C, will retrieve each block of the file 10 independently, making each server S1 to S3, available for longer to the other clients as the reading load would be distributed over three servers instead of a single one.

Distributed file systems of the state of the art further comprise a data replication mechanism on several servers for fault tolerance purposes. Thus, each data block of a file 10 will be replicated at least once. Thus, the distributed file system stores each block of the file 10 twice. This is shown in [FIG. 1], where each block A, B and C, of the file 10 is stored at least and on one main server (S1, S2 and S3, respectively), and on a secondary server (S4, S4 and S5, respectively). It further is possible to replicate the same block of the file 10 several times as shown for block A of the file 10, which is stored on the three servers S1, S4 and S5. Current distributed file systems only use replication for fault-tolerance purposes: if one of the servers breaks down, another server takes over. The distributed file systems of the state of the art operate with a primary server and several replication servers. Thus, to access each data block of the file, the clients C1 to C3 are only authorized to access the primary server since secondary servers are reserved for data redundancy in the event of a fault of the primary server.

To let clients know about the location of the primary servers of the file blocks, each distributed file system has its own implementation. For instance, Ceph® is a distributed file system comprising a metadata server to provide the address of the server comprising a required block to a client, while GlusterFS® is a distributed file system not comprising a metadata server. GlusterFS® clients locate files algorithmically by using an "elastic" hash algorithm.

A problem of high-performance computing systems is inherent to distributed file systems. In fact, while the computational and communication performance evolves favorably with the number of computing nodes, performance in terms of the number of input-output operations of the distributed file system evolves unfavorably with an increase in the number of computing nodes. Input-output operations at a file server in a distributed file system is expressed in IOPS (input/output operations per second). Thus, when several clients C1 to C3, seek to reach the same file block A at the same time, a bottleneck is created: performance depends, in particular, on the bandwidth of the file server and the capabilities of the storage drives it comprises.

To solve this problem, so-called "parallel" file systems (Lustre®, GPFS®, BeeGFS®) have been developed but their performance could still be improved.

There is therefore a need to have a distributed file system that makes it possible to solve the problems of the state of the art in terms of access performance for a plurality of clients to the files in file servers.

BRIEF SUMMARY OF THE INVENTION

At least one embodiment of the invention offers a solution to the problems mentioned above by making it possible for clients to access replicas of data blocks in addition to the data blocks already accessible. The word "invention" as used herein means "embodiments of the invention" or "aspects of the invention" and is not intended to limit the invention to a particular structure or method.

An aspect of the invention therefore relates to a method for a plurality of clients to access at least part of a file in a distributed file system comprising a plurality of servers, the part of the file being stored in a server of the plurality of servers and replicated in at least one other server of the plurality of servers, the method being characterized in that it comprises the steps of:

Receiving, via an access management device, a request to access the part of the file sent by a first client from the plurality of clients, Selecting, via the access management device, a first server from among the server comprising the part of the file and the at least one other server comprising the replica of the part of the file, based on at least one parameter, Authorizing, by the access management device, the first client to access the part of the file or the at least one replica of the part of the file, the authorization comprising the establishment of the connection between the first client and the first server selected for the first client to access the part of the file.

Receiving, following the access authorization for the first client to access the part of the file or the at least one replica of the part of the file stored by the first server, via the access management device, of a request to access the same part of the file sent by a second client of the plurality of clients, the second client being different from the first client, Selecting, by the access management device, of a second server from among the server comprising the part of the file and the at least one other server comprising the replica of the part of the file, based on the parameter, the second server being different from the first server, Authorizing, by the access management device, the second client to access the part of the file or the at least one replica of the part of the file, the authorization comprising the establishment of the connection between the second client and the second server selected for the second client to access the part of the file.

By virtue of the invention, the reading performance for each server for access to the same file by a plurality of clients is improved (by up to a factor of two for two replications, a factor of three for three replications, etc.), providing access to the different replicas stored in the different servers to the plurality of clients.

Furthermore, an access management device makes it possible to distribute the client access of the plurality of clients across the different servers. Thus, a single server is no longer solely responsible for serving a file or part of a file, but rather, several servers are responsible for serving the file or the part of the file. The creation of a "bottleneck" is avoided in terms of performance at the servers that are solely responsible for serving a file or part of a file for a plurality of clients.

The method according to the invention is advantageously implemented by an access management device. Thus, the invention advantageously uses the metadata servers already present in certain distributed file systems to manage load distribution across the different servers storing the same file or part of the file. This further allows for scaling the file system by simply adding access management devices when more clients are added to the network.

A "part of a file" is defined as a piece of a file, for example a data block when the file is divided into data blocks. In the rest of the disclosure, a part of a file may also refer to the entire file.

Furthermore, the invention enables the access management device to select a server based on a parameter. This parameter allows for flexibility when selecting the server that will serve the file or the part of the file, as it can be modified based on the characteristics of the network and at the discretion of a network administrator. Thus, when the network is small, a certain selection parameter may be chosen and when the network grows, for example with the addition of new clients and/or new servers, this parameter may be updated at the access management device to be more suited to the new characteristics of the network.

Since the access management device only selects a server and establishes the connection between the selected server and the client, there is no bandwidth saturation, the file or part of the file advantageously being sent directly by the selected server to the client, without going via the access management device. In fact, the invention even allows for very high availability since the invention enables a better distribution of readings across more servers, so each server is either less loaded or able to handle more queries.

In addition to the characteristics mentioned in the preceding paragraph, the method for accessing at least part of a file according to an aspect of the invention may present one or more complementary characteristics from the following, taken individually or according to all the combinations technically possible:

when the access management device receives a request to access the same part of the file sent by a third client and access to each replica of the part of the file has already been authorized to clients from the plurality of clients, then the method comprises the steps of:

Selecting, by the access-management device, of a server from the first server and the second server, based on the parameter, Authorizing, by the access management device, the third client to access the part of the file stored by the server selected from the first server and the second server.

authorizing a client from the first, second and third client to access the part of the file stored on a server selected from the first, second and third server comprises:

sending a server identifier to the client or establishing the connection by the access management device between the client and the server, establishing the connection comprising the access management device sending a connection request to the server on behalf of the client and receiving confirmation that the connection between the server and client has been established.

selecting a server from the first, second and third server comprises sending a request to the server and receiving a response to this request, the response comprising at least one value of the parameter at the server.

the file is divided into blocks, each block being part of the file.

the at least one parameter comprises a server identifier defined by a load distribution algorithm.

the load distribution algorithm is a "round-robin" algorithm or a more complex one with load management (number of active connections, CPU load, etc.).

the at least one predefined parameter comprises a performance parameter of each server from the plurality of server storing the part of the file.

the performance parameter of each server is chosen selected from the number of simultaneous clients, the bandwidth, the server type, the types of drives of the server, the type of network connection, the number of input and output operations per second.

Another aspect of the invention relates to an access management device configured to implement the method for accessing at least one part of a file according to the invention.

Yet another aspect of the invention relates to a distributed file system comprising the access management device according to the invention, the distributed file system further comprising the plurality of clients and the plurality of servers, the part of the file being stored on a server of the plurality of servers and replicated on at least one other server of the plurality of servers.

Yet another aspect of the invention relates to a high-performance computing system comprising a plurality of client computing nodes, at least one server storage node, the high-performance computing system being characterized in that it is configured to implement the distributed file system according to the invention.

Yet another aspect of the invention relates to a computer software package comprising instructions that, when the software is executed by a computer, make the latter implement the steps of the access management method according to the invention.

Yet another aspect of the invention relates to a computer-readable recording medium comprising instructions that, when executed by a computer, make the latter implement the steps of the access management method according to the invention.

The invention and its different applications will be better understood after reading the following disclosure and examining the accompanying figures.

BRIEF DESCRIPTION OF THE FIGURES

The figures are presented by way of reference and are in no way limiting to the invention.

DETAILED DESCRIPTION

The figures are presented by way of reference and are in no way limiting to the invention.

Unless otherwise stated, the same element appearing in different figures has the same reference.

Figure 1:
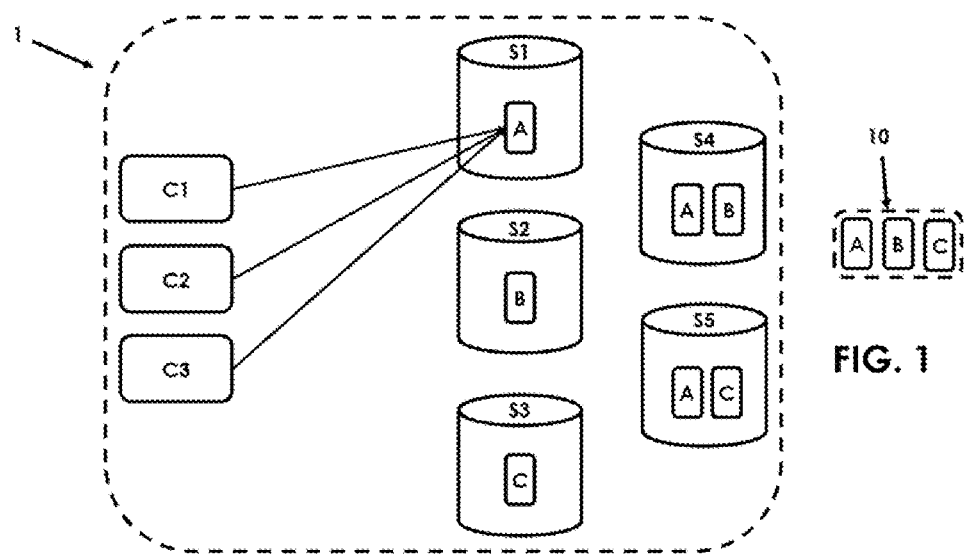
FIG. 1 shows a schematic depiction of a distributed file system according to the background art.
Figure 2:
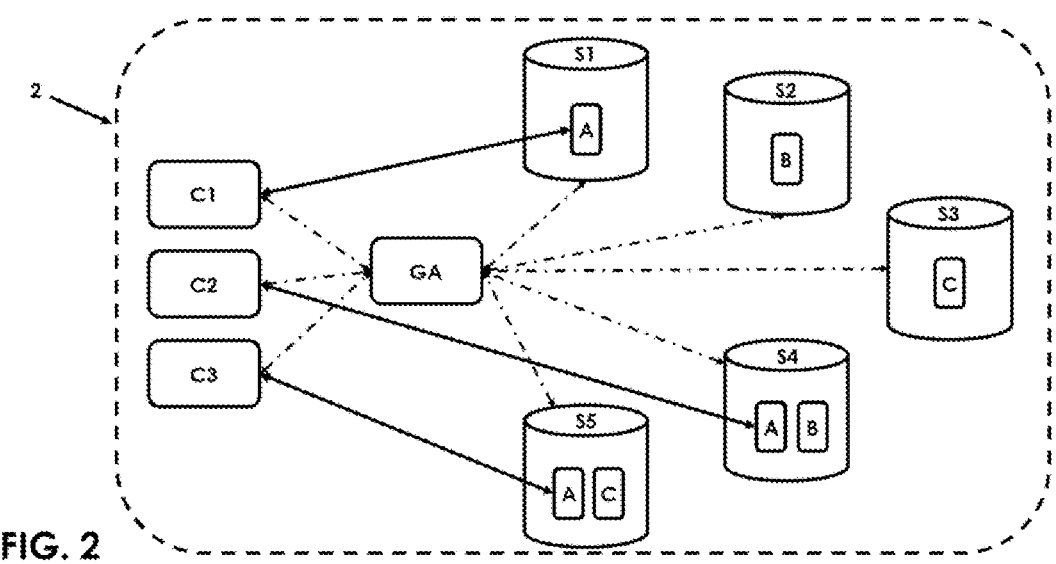
FIG. 2 shows a schematic depiction of a distributed file system according to the invention.

[FIG. 2] shows a schematic depiction of a distributed file system according to the invention.

The distributed file system 2 according to the invention represented in [FIG. 2] comprises a plurality of clients C1 to C3, a plurality of servers S1 to S5, and an access management device GA. The distributed file system 2 can implement any known type of distributed file system, such as for example Ceph® or GlusterF S®. Advantageously, the access management device GA may be a metadata server already present in certain distributed file systems but implementing the access management method according to the invention and comprising the necessary modules.

A file 10 is divided into several data blocks A to C. These data blocks are, for instance, the same size but may be of different sizes depending on the system used and the desired features.

As known in the state of the art, the blocks A to C of the file 10 are distributed across several servers. Block A is stored on server S1, block B on server S2, block C on server S3. The blocks are also replicated on other servers. Thus, blocks A and B are replicated on server S4 and blocks A and C are replicated on server S5. The distributed file system 2 may be configured to duplicate files a fixed number of times, for example 2 times, or to duplicate them a different number of times depending on the part of the file or depending on the file and/or its characteristics.

The access management device GA is connected to each of the clients C1 to C3, and each of the servers S1 to S5. These connections may be implemented according to any known network protocol. These connections may be established via Ethernet or InfiniBand® networks when the distributed file system 2 is implemented by a high-performance computing system HPC.

The servers S1 to S5 may be comprised in the same local network or in different local networks depending on how the servers are physically distributed. The same applies to the clients C1 to C3, which may be included in the same local network, for example in the same computer cabinet, or in different local networks depending on how the clients are geographically distributed.

The access management device GA may be comprised in the same local network as the client or clients seeking to access the file 10 or one of the blocks A to C, or may be comprised in a different local network, or even be comprised in the same local network as one of the clients but not in the same local network as the others. Likewise, the access management device GA may be included in the same local network as the server or servers comprising the file 10 or one of the blocks A to C, or may be comprised in a different local network or even be comprised in the same local network as one of the servers but not in the same local network as the others. These considerations are at the discretion of the administrator of the distributed file system 2, depending on the number of clients, of servers and the performance desired.

The access management device GA is configured to implement a method 3 for to accessing at least one part of the file 10 by a plurality of clients C1 to C3 in the distributed file system 2.

Figure 3:
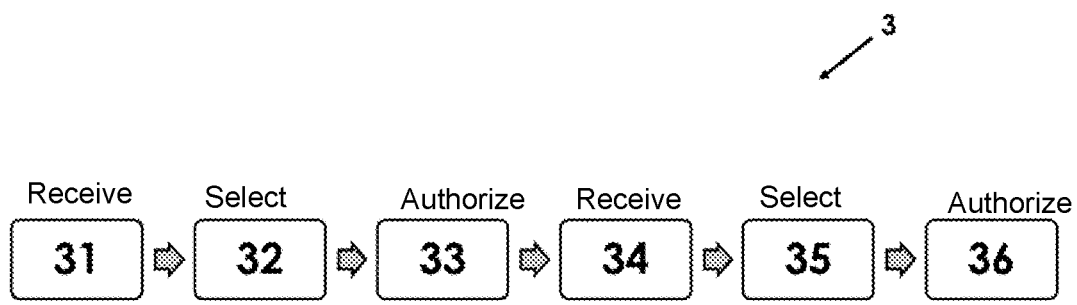
FIG. 3 shows a schematic depiction of the method for accessing a file according to the invention.

[FIG. 3] shows a schematic depiction of the method for accessing a file according to the invention.

Figure 4:
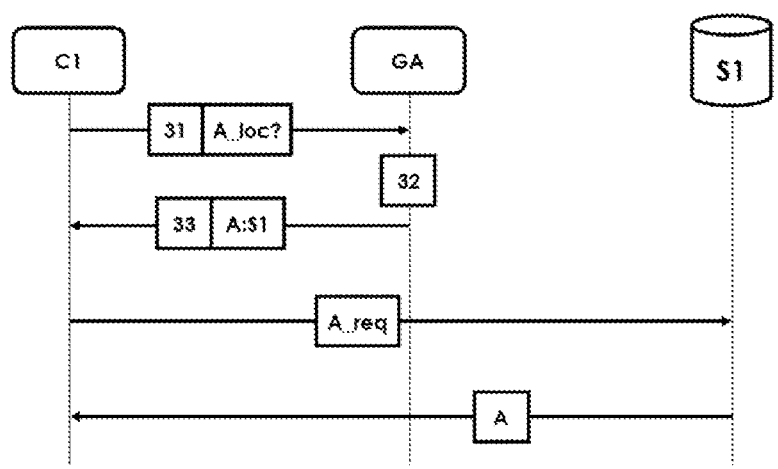
FIG. 4 shows a schematic depiction of the exchanges between entities in a first part of the method for accessing a file according to the invention

A first part of the access method 3 is implemented by the access management device GA between the client C1 and the server S1 of the distributed file system 2, as shown in [FIG. 4].

In a first step 31, the access management device GA receives a request to access a part A of the file 10, the request having been sent by the client C1 of the plurality of clients. This request A_loc may comprise an identifier of the client C1, such as for example a network address, or any other means to identify the client C1, an indication relating to the file or the part of the file required, for example herein an identifier of the block A of the file 10, and any other indication necessary to authenticate the client C1 with the access management device GA.

In a second step 32, the access management device GA selects a server form the group of servers comprised in the distributed file system 2 storing the block A of the file 10. Whether the block A is the original block A or the replicas may be taken into account in the selection, for example by favoring the server comprising the original block A. In the example depicted in [FIG. 4], the access management device GA selects the server S1.

The selection of step 32 is carried out based on a parameter. A parameter is associated with at least one rule, allowing for selecting a server from the servers S1 to S5 of the distributed file system 2. Thus, when the selection is carried out "based on a parameter", the value of a defined parameter is compared to a rule, for example a threshold, in order to determine whether a server must be selected. A parameter may also be one or more server identifier(s) defined, for instance, by a load distribution algorithm. The load distribution algorithm may thus be a "round robin" algorithm or a more complex algorithm, taking into account the parameter or parameters defined and/or one or several additional parameters. For a required block A of the file 10, the round robin algorithm, defining a list of servers that can serve the block A, provides access to a first server S1 from the list comprising block A to the first client requesting access, for example the client C1, as depicted in [FIG. 4].

Figure 5:
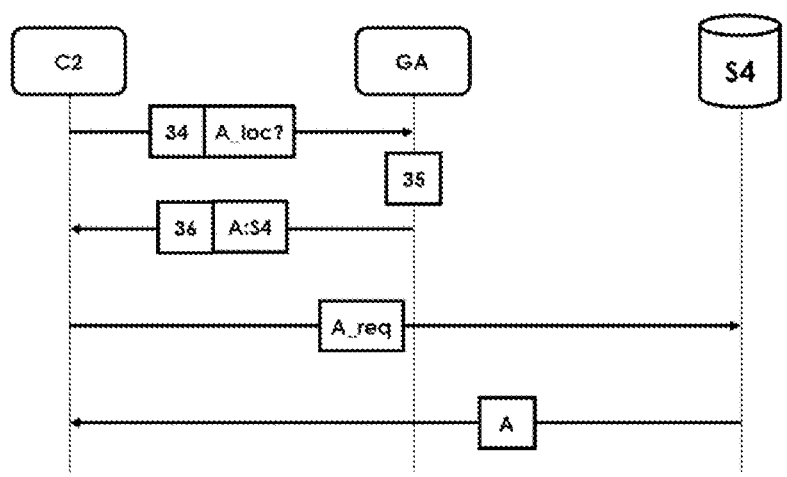
FIG. 5 shows a schematic depiction of the exchanges between entities in a second part of the method for accessing a file according to the invention

Then the second client, e.g. C2, requesting access to block A of the file 10 is given access to the second server S4 from the list comprising block A as depicted in [FIG. 5]. This is repeated until the last server in the list is accessed by a client.

When another client requests access to block A of the file 10 and all the servers comprising block A are already serving a client, the algorithm once again indicates the first server S1 of the list. The parameter may also be, for instance, a performance parameter for each server from the plurality of servers storing the part of the file. For example, the performance parameter for each server may be the number of simultaneous clients served by the server, the bandwidth available to and/or used by the server, the server type (type, processor generation and frequency, memory size, etc.), the type of drives in the server (spinning, SSD, NVMe, in-memory, etc.), the type of network connection, the number of input-output operations per second (IOPS), the CPU load, the number of active network connections, etc.

The values of these parameters can be obtained by carrying out a query via the access management device to the servers or by external devices allowing for monitoring to be carried out. These external devices comprise metric collection functions that may then be used, in particular by the invention.

At least one embodiment of the invention also covers the use of several parameters to select at least one server. In a preferred embodiment, the joint use of several parameters will be favored as it allows for finer server selection. For instance, the number of clients served by the server and the number of input-output operations per second may be used. A server identifier parameter may also be combined, limiting to a certain predefined number of servers, with a performance parameter for each of the predefined server.

The method 3 represented in [FIG. 3] then comprises an access authorization step 33 by the access management device GA, of the client C1 to the block A stored by the server S1 selected in the selection step 32. The access authorization step 33 may comprise, based on the embodiment, sending the client C1 an identifier of the server S1 for it to carry out the connection itself afterwards. The access authorization step 33 may also comprise establishing the connection via the access management device GA between the client C1 and the server S1, establishing the connection comprising the access management device GA sending a connection request to the server S1 on behalf of the client C1 and receiving confirmation that the connection between server S1 and client C1 has been established. This makes it possible for the connection to be initiated by the server S1 rather than by the client C1. The access authorization step 33 may also comprise any other means to provide the client C1 access to the server S1 in the distributed file system 2.

When the client C1 has received the authorization to access a server, server S1 in this case, of the plurality of servers, the client C1 may, in a first embodiment, initiate the connection to the server S1. This comprises sending, to the server S1 which has been notified to the client C1 as the allocated server, a request A_req for the data block A as represented in [FIG. 4]. The steps to establish the connection and exchange the block A are not part of the method for accessing at least one file 3 as these steps are not implemented by the access management device A. When the server S1 receives the request A_req, it serves the data block A to the client C1. In an alternative embodiment, the access management device GA may, on behalf of the client C1, send a request to establish the connection directly to the server S1, which will then establish itself the connection between the client C1 and itself. Thus, the client C1 is not aware of the server S1 allocated to them to access the block A. It will only gain such knowledge upon receiving information from the server S1 directly.

The method 3 represented in [FIG. 3] comprises, after the authorization step 33 to authorize the client C1 to access the server S1, a reception step 34, also represented in [FIG. 5] by the access management device GA, of a request to access the same block a of the file 10 sent by another client C2. The invention advantageously uses the replicas created for fault tolerance purposes by the distributed file system 2 to improve the performance of accessing files of the distributed file system 2.

After the access management device GA receives the request to access the block A, the access management device GA carries out a selection step 35 to select another server S4 from the servers comprising the block A, whether the original data block A or the replicated data block A, based on the same parameter(s) used for the selection step 32 to select a server for the client C1. Thus, a server other than the server S1 comprising block A is selected in order for the client C2 to access the block A. This allows for the load to be distributed across the servers comprising the block A for simultaneous access to the block A by a plurality of clients, and therefore improve access performance of the distributed file system 2. For instance, when the block A is a network boot image and a plurality of nodes of a high-performance computing system seek to access the boot image when these nodes are booted simultaneously, boot performance is greatly improved since nodes are redirected towards different servers when, in the state of the art, performance was limited by the bandwidth of the "primary" server.

The access management device GA can be aware of the clients that have recently requested access to the data block A as well as of the servers allocated thereto to balance the load on other servers when other clients request access to the same block A, for example by sharing an access table across the different access management devices GA of the distributed file system or by Then, the method for accessing a file 3 includes an authorization step 36 for the client C2 to access the server S4 selected in the previous selection step 35. The access authorization step 36 may comprise, based on the embodiment, sending the client C2 an identifier of the server S4 for it to carry out the connection itself afterwards. The access authorization step 36 may also comprise establishing the connection by the access management device GA between the client C2 and the server S4, establishing the connection comprising the access management device GA sending a connection request to the server S4 on behalf of the client C2 and receiving confirmation that the connection between server S4 and client C2 has been established. This makes it possible for the connection to be initiated by the server S4 rather than by the client C2. The access authorization step 36 may also comprise any other means to provide the client C2 access to the server S4 in the distributed file system 2.

By virtue of the invention, a replica of block A is used to improve access performance of the distributed file system 2 and not only for managing server fault tolerance, by different clients simultaneously accessing several servers.

The invention is also interesting in the case of accessing small files, for example smaller than the size of the blocks of the distributed file system. In fact, in the case of large files, several clients may need to access the same server that comprises different blocks (for example see server S4 comprising the blocks A and B). Thus, when seeking to access each block of the file, several clients may need to simultaneously access the same server. In the case of small files, this problem does not happen since the server conventionally does not comprise an original data block and its replica. It should be noted that, while this is less advantageous, the invention also allows for creating replicas on the same server to improve access performance, for example by storing the replica on another drive of the same server and therefore not being limited by the performance of a single drive contrary to the state of the art.

What is claimed is:

1. A method for a plurality of clients to access a part of a file comprising at least one part of the file in a distributed file system comprising a plurality of servers, the part of the file being stored on a server of the plurality of servers and replicated on at least one other server of the plurality of servers, the method comprising:

receiving, by an access management device of said distributed file system, a request to access the part of the file sent by a first client of the plurality of clients, wherein the access management device comprises a metadata server comprising instructions configured to manage access to the part of the file, wherein the access management device is connected to each client of the plurality of clients and each server of the plurality of servers via a network, and wherein the request to access the part of the file sent by the first client comprises an identifier for the first client to authenticate the first client with the access management device, selecting, by the access management device, of a first server from among the server comprising the part of the file and the at least one other server comprising at least one replica of the part of the file, based on at least one parameter, wherein said at least one parameter is associated with at least one rule that allows a selection from the server of the plurality of servers of the distributed file system, wherein the selecting of the first server comprises comparing a value of the at least one parameter to a rule of the at least one rule to determine whether said first server is to be selected, authorizing, by the access management device, the first client to access the part of the file or the at least one replica of the part of the file stored by the first server selected for the first client to access the part of the file, receiving, by the access management device, another request to access a same part of the part of the file sent by a second client of the plurality of clients, following authorization for the first client to access the part of the file or the at least one replica of the part of the file stored by the first server, wherein the second client is different from the first client, wherein the another request to access the same part of the part of the file sent by the second client comprises an identifier of the second client to authenticate the second client with the access management device, selecting, by the access management device, of a second server from among the server comprising the part of the file and the at least one other server comprising the at least one replica of the part of the file, based on the at least one parameter used when selecting the first server, the second server being different from the first server, authorizing, by the access management device, the second client to access the part of the file or the at least one replica of the part of the file stored by the second server selected for the second client to access the part of the file; wherein said second server is different from said first server such that a load is distributed across said first server and said second server when said first client and said second client simultaneously request access to the part of the file, to allow said first client and said second client to access the part of the file simultaneously via said first server and said second server and to improve access performance of the distributed file system since said first client and said second client of the plurality of clients are directed towards different servers of the plurality of servers when simultaneously requesting access to the part of the file, wherein the access management device distributes client access of the plurality of clients across said plurality of servers that are different, such that several servers of the plurality of servers are responsible for serving the part of the file and a single server of the plurality of servers is not solely responsible for serving the part of the file for the plurality of clients, wherein said at least one parameter allows flexibility in said selecting said first server and said second server that will serve the part of the file for said first client and said second client respectively, as the at least one parameter is configured to be modified by a network administrator via said access management device based on characteristics of the network comprising said plurality of clients and said plurality of servers, wherein said first server is selected for said first client and when said second server is selected for said second client, a connection is established between the first server and the first client and another connection is established between the second server and the second client such that the part of the file is sent directly by the first server that is selected to the first client without going via the access management device, the part of the file is sent directly by the second server that is selected to the second client without going via the access management device.

2. The method for a plurality of clients to access the at least one part of the file according to claim 1 wherein when the access management device receives the request to access the same part of the file sent by a third client and an access to each replica of the part of the file has already been authorized to clients of the plurality of clients, then the method further comprises selecting, by the access management device, of the server from the first server and the second server, based on the at least one parameter, authorizing, by the access management device the third client to access the part of the file stored by the server selected from the first server and the second server.

3. The method for a plurality of clients to access the at least one part of the file according to claim 1 wherein access authorization for a client from the first client, the second client and a third client, to the part of the file stored on the server from the first server and the second server comprises sending a server identifier to the client or establishing the connection by the access management device between the client and the server, wherein establishing the connection comprises the access management device sending a connection request to the server on behalf of the client and receiving confirmation that the connection between the server and the client has been established, such that the connection is initiated by the server rather than the client.

4. The method for a plurality of clients to access the at least one part of the file according to claim 1 wherein the file is divided into blocks, each block being the part of the file.

5. The method for a plurality of clients to access the at least one part of the file according to claim 1 wherein the at least one parameter comprises at least one server identifier defined by a load distribution algorithm.

6. The method for a plurality of clients to access the at least one part of the file according to claim 5 wherein the load distribution algorithm is a round robin algorithm or said load distribution algorithm taking into account the at least one parameter at the plurality of servers.

7. The method for a plurality of clients to access the at least one part of the file according to claim 1 wherein the at least one parameter comprises a performance parameter of each server of the plurality of servers storing the part of the file.

8. The method for a plurality of clients to access the at least one part of the file according to claim 7 wherein the performance parameter of each server is selected from one or more of a number of simultaneous clients, a bandwidth, a server type, a type of drives of the server, a type of network connection, a number of input-output operations per second.

9. The method for a plurality of clients to access the at least one part of the file according to claim 1 wherein the method is implemented on a non-transitory computer software package comprising software that comprises software instructions that, when the software is executed by a computer, the computer implements the method.

10. The method for a plurality of clients to access the at least one part of the file according to claim 1 wherein the method is implemented on a non-transitory computer readable recording medium comprising recording medium instructions that, when executed by a computer, the computer implements the method.

11. A distributed file system comprising:
an access management device configured to allow a plurality of clients to access a part of a file comprising at least one part of the file,
a plurality of clients and a plurality of servers, wherein the part of the file is stored on a server of the plurality of servers and replicated on at least one other server of the plurality of servers, wherein said access management device is further configured to
receive a request to access the part of the file sent by a first client of the plurality of clients, wherein the access management device comprises a metadata server comprising instructions configured to manage access to the part of the file, wherein the access management device is connected to each client of the plurality of clients and each server of the plurality of servers via a network, and wherein the request to access the part of the file sent by the first client comprises an identifier for the first client to authenticate the first client with the access management device,
select a first server from among the server comprising the part of the file and the at least one other server comprising at least one replica of the part of the file, based on at least one parameter, wherein said at least one parameter is associated with at least one rule that allows a selection from the server of the plurality of servers of the distributed file system, wherein the select the first server comprises comparing a value of the at least one parameter to a rule of the at least one rule to determine whether said first server is to be selected,
authorize the first client to access the part of the file or the at least one replica of the part of the file stored by the first server selected for the first client to access the part of the file,
receive, by the access management device, another request to access a same part of the part of the file sent by a second client of the plurality of clients, following authorization for the first client to access the part of the file or the at least one replica of the part of the file stored by the first server, wherein the second client is different from the first client, wherein the another request to access the same part of the part of the file sent by the second client comprises an identifier of the second client to authenticate the second client with the access management device,
select a second server from among the server comprising the part of the file and the at least one other server comprising the at least one replica of the part of the file, based on the at least one parameter used when selecting the first server, the second server being different from the first server, authorize the second client to access the part of the file or the at least one replica of the part of the file stored by the second server selected for the second client to access the part of the file; wherein said second server is different from said first server such that a load is distributed across said first server and said second server when said first client and said second client simultaneously request access to the part of the file, to allow said first client and said second client to access the part of the file simultaneously via said first server
and said second server and to improve access performance of the distributed file system since said first client and said second client of the plurality of clients are directed towards different servers of the plurality of servers when simultaneously requesting access to the part of the file, wherein the access management device distributes client access of the plurality of clients across said plurality of servers that are different, such that several servers of the plurality of servers are responsible for serving the part of the file and a single server of the plurality of servers is not solely responsible for serving the part of the file for the plurality of clients, wherein said at least one parameter allows flexibility in selecting said first server and said second server that will serve the part of the file for said first client and said second client respectively, as the at least one parameter is configured to be modified by a network administrator via said access management device based on characteristics of the network comprising said plurality of clients and said plurality of servers, wherein when said first server is selected for said first client and when said second server is selected for said second client, a connection is established between the first server and the first client and another connection is established between the second server and the second client, such that the part of the file is sent directly by the first server that is selected to the first client without going via the access management device,
the part of the file is sent directly by the second server that is selected to the second client without going via the access management device.

12. The distributed file system according to claim 11 wherein the distributed file system is implemented on a high-performance computing system, wherein said high performance computing system comprises a plurality of client computing nodes, a plurality of server storage nodes.

* * * * *